(12) United States Patent
Breuer et al.

(10) Patent No.: US 11,223,984 B2
(45) Date of Patent: Jan. 11, 2022

(54) METHOD FOR OPERATING A USER EQUIPMENT IN A CELLULAR NETWORK

(71) Applicant: THALES DIS AIS Deutschland GmbH, Munich (DE)

(72) Inventors: Volker Breuer, Boetzow (DE); Lars Wehmeier, Falkensee (DE)

(73) Assignee: THALES DIS AIS DEUTSCHLAND GMBH, Munich (DE)

( * ) Notice: Subject to any disclaimer, the term of this patent is extended or adjusted under 35 U.S.C. 154(b) by 32 days.

(21) Appl. No.: 16/640,250

(22) PCT Filed: Jul. 31, 2018

(86) PCT No.: PCT/EP2018/070779
§ 371 (c)(1),
(2) Date: Feb. 19, 2020

(87) PCT Pub. No.: WO2019/038039
PCT Pub. Date: Feb. 28, 2019

(65) Prior Publication Data
US 2020/0367122 A1 Nov. 19, 2020

(30) Foreign Application Priority Data
Aug. 22, 2017 (EP) ..................... 17187175

(51) Int. Cl.
*H04W 36/00* (2009.01)
*H04W 36/08* (2009.01)
(Continued)

(52) U.S. Cl.
CPC . *H04W 36/00837* (2018.08); *H04W 36/0058* (2018.08); *H04W 36/08* (2013.01); *H04W 52/242* (2013.01); *H04W 52/367* (2013.01)

(58) Field of Classification Search
CPC ......... H04W 36/0058; H04W 36/0083; H04W 36/00837; H04W 36/08; H04W 36/24;
(Continued)

(56) References Cited

U.S. PATENT DOCUMENTS

| 8,463,270 B2 | 6/2013 | Thorson et al. |
| 2007/0275722 A1* | 11/2007 | Thorson ............ H04W 36/0058 455/436 |

(Continued)

OTHER PUBLICATIONS

International Search Report (PCT/ISA/210) dated Aug. 21, 2018, by the European Patent Office as the International Searching Authority for International Application No. PCT/EP2018/070779.
(Continued)

*Primary Examiner* — Quoc Thai N Vu
(74) *Attorney, Agent, or Firm* — Buchanan Ingersoll & Rooney PC

(57) ABSTRACT

The present invention relates to a method for operating a user equipment maintaining a normalized transmission power value, indicating the maximum transmission power of the transmitting circuitry of the user equipment, further comprising the step for the user equipment of: receiving a predetermined sufficient power level to be achieved at the base station receiver from the base station, deriving a pathloss value from signals received from the serving base station, determining a signal power value out of the normalized transmission power value of the user equipment and the pathloss value, and when the determined signal power value level is lower than a predetermined sufficient power level at the base station: performing a cell re-selection to another base station.

10 Claims, 3 Drawing Sheets

(51) Int. Cl.
*H04W 52/24* (2009.01)
*H04W 52/36* (2009.01)

(58) Field of Classification Search
CPC . H04W 52/242; H04W 52/367; H04W 48/20;
H04W 36/04; H04W 36/14
See application file for complete search history.

(56) References Cited

U.S. PATENT DOCUMENTS

| | | |
|---|---|---|
| 2015/0098387 A1 | 4/2015 | Garg et al. |
| 2016/0212674 A1 | 7/2016 | Nakamura et al. |
| 2016/0219504 A1* | 7/2016 | Cho .................. H04W 48/16 |
| 2016/0227489 A1 | 8/2016 | Oteri et al. |
| 2016/0309360 A1 | 10/2016 | Noldus |
| 2019/0037450 A1* | 1/2019 | Chang ............... H04W 36/0072 |

OTHER PUBLICATIONS

Written Opinion (PCT/ISA/237) dated Aug. 21, 2018, by the European Patent Office as the International Searching Authority for International Application No. PCT/EP2018/070779.

* cited by examiner

METHOD FOR OPERATING A USER EQUIPMENT IN A CELLULAR NETWORK

FIELD OF THE INVENTION

The present invention relates to a method for operating a user equipment in a cellular network comprising more than one radio access networks. The invention also pertains to a user equipment using said method.

The invention further relates to a method for a base station of a cellular network. The invention also pertains to a base station using said method.

BACKGROUND OF THE INVENTION

In currently known cellular networks for wireless communication it is known, that more than one radio access networks (RANs) co-exist. Typically user equipments that are designed for operating with the cellular network are configured to operate with base stations of at least a subset of the more than one radio access networks. Changing from one RAN to another is done by means of a so-called interRAT handover resp. re-selection.

By now each of the radio access networks was meant to cover the majority of the covered area, at least in urban areas. With the definition of new radio access networks in higher frequency ranges, in particular 5G resp. "new radio", this premise was given up, as the high frequency ranges above e.g. 6 GHz will be expected not to cover the entire coverage area, instead 4G cells are available for assuring connectivity. Hence for a moving user equipment this means that when leaving the base station of a 5G cell at one point in time an interRAT handover/cell-reselection to 4G (or lower) is necessary before the next 5G cell will be sufficiently good decodable.

It is obvious that customer expectations comprise being supplied with the highest available technology as long as possible, in particular when operating in connected mode. Hence, the later the interRAT handover takes place, the better the customer experience. And moreover the scarce lower frequency network resources are not affected more than necessary.

However, 5G is designed for a plurality of high frequency bands, with a scattered distribution on worldwide networks. But on the other hand no user equipment will be able to provide an equally high receiver sensitivity on all those frequency bands. Preferably there will be an optimization for selected frequency bands with high receiver sensitivity, accompanied with a basic receiver sensitivity which complies with a minimum receiver sensitivity according to regulatory resp. operator purposes for the other frequency bands. It is clear for skilled persons that a higher receiver sensitivity allows the user equipment to sufficiently receive signals from a base station even when being located at higher distance from the base station than with a lower receiver sensitivity.

With the known procedure from previous technology standards the expected receiver sensitivity is assumed to be constant, that means to be on the safe side it is assumed to be equal to or near to the minimum receiver sensitivity. Consequently the base station makes an interRAT handover decision during a running connection session when the user equipment is expected to be close to the cell border, which is the place when according to a given receiver sensitivity the signals transmitted from the base station just are sufficiently strong to be decoded. However, with a better receiver sensitivity the cell border would be reached much later, which leads to the mentioned bad customer experience i.e. to early handover, even though coverage still would be feasible but RRM algorithms decide according to the user equipments predetermined minimum receiver sensitivity. This is currently not taken into account with the effect that such user equipments are forced to an interRAT handover into legacy RATs far earlier than necessary.

Especially here it is to mention that a similar effect can occur in the uplink direction. For transmissions the user equipment's mandatory output power is rather small in the respective frequency bands but user equipments could be optimized or benefit from improved technology and could provide higher power. This is currently likewise not taken into account by the known technology.

It is therefore the goal of present invention to overcome the mentioned disadvantages and to propose a solution for an improved handover decision of the base station for the user equipment.

Further alternative and advantageous solutions would, accordingly, be desirable in the art.

SUMMARY OF THE INVENTION

For this it is according to a first aspect of the invention it is proposed a method for operating a user equipment (UE) in a cellular network (CN) comprising more than one radio access networks, the user equipment camping on a base station (BS) of a first of the more than one radio access networks, hereinafter the serving base station, the user equipment maintaining a normalized transmission power value, indicating the maximum transmission power of the transmitting circuitry of the user equipment,
further comprising the step for the user equipment of:
  receiving a predetermined sufficient power level to be achieved at the base station receiver from the base station,
  deriving a pathloss value from signals received from the serving base station,
  determining a signal power value out of the normalized transmission power value of the user equipment and the pathloss value,
when the determined signal power value level is lower than a predetermined sufficient power level at the base station:
  performing a cell re-selection to another base station.

The inventive method relies on user equipments that are wirelessly operating with a cellular network, which provides a couple of radio access networks (RANs). This is in particular the case for cellular networks providing a 5G ("new radio") RAN and a 4G RAN. As it is decided that the 5G and 4G RANs will co-exist, with the 4G as safe harbor for assuring sufficient connectivity, this is the most likely scenario. Nonetheless other RANs might also be involved, e.g. 3G or even 2G. Without limiting the scope of the invention, it is in the following mainly referred to the 4G/5G scenario. Especially for 4G/5G scenarios tight inter-working is considered in general, so the addressed issue is in that combination imminent.

The invention starts with a user equipment camping on a base station of the first radio access network. In case of a 4G and 5G network, such base stations are called eNodeBs (eNB) or next generation NodeBs (gNB).

The most advantageous effect of the invention is achieved, when the user equipment is camping on a base station of a radio access network with limited coverage. That means in the surrounding of the respective serving base station no other base station of the same radio access network with the same quality of service is available. The quality of service in particular relates to data throughput, availability and/or latency. In that sense the best effect of the invention is achieved when by leaving the base station due to a handover resp. cell reselection a lower quality of service would be received for the user equipment.

Depending upon the type of user equipment a handover to a base station of a lower standard base station may become extremely disadvantageous. This holds in particular true as the user equipment encompasses not only mobile handsets, like smartphone, but also machine-type communication devices, that depend on such quality of service level. This is in particular the case for remotely controlled surgery devices or industrial robots being remotely controlled. However, the reduction in bandwidth when being handed over to a technology on a lower frequency leads immediately to a maximum throughput reduction and hence will be disadvantageous for all user equipments executing large downloads or uploads of data.

It requires nonetheless for setting up a communication between a base station and a user equipment to take into account the uplink direction. According to the invention t it is suggested to fulfill this task Especially for a user equipment being able to receive the base station signals in the downlink it is efficient to evaluate whether it could achieve minimum communication capabilities in the uplink (UL) given that available UL-power of various user equipments may vary.

It is hence suggested that the user equipment maintains with the normalized transmission power value the maximum transmission power of the transmitter of the user equipment. Preferably such value is likewise stored as constant physical parameter of the user equipment, the available transmission power is stored and maintained for respective frequency segments where the maximum transmission power is the minimum available transmission power of all frequency segments forming the corresponding frequency band.

The problem for the user equipment is to figure out the expected signal strength of the user equipment at the base station. It is hence suggested to determine the pathloss value from received signals from the base station. This is typically done by common known procedures i.e. measuring reference signals. Depending on uplink and downlink (DL) difference the base station can also provide in its broadcast besides the expected UL signal strength at its receiver. This also applies to the correction factor when transferring DL pathloss to UL pathloss in the user equipment, and respectively a corresponding hysteresis By applying the pathloss value to the normalized transmission power value, the user equipment determines a signal power value. This is indicative of the expected value of received signal strength at the base station, this value is compared to the expected value signaled by the base station.

By comparing such signal power value to the value received from the base station, the user equipment is put into the position to check whether a communication attempt in the UL would lead to success or whether the user equipment should reselect. If it is lower than a predetermined sufficient power level, then the user equipment would autonomously perform a re-selection due to expected UL problems. The coverage area in transmission direction is mainly derived in the UL as the user equipment's power is expected to be smaller than the power of the base station transmitter.

Similar also the user equipment can signal the representative evaluated pathloss and its power capabilities and the base station could inform the user equipment accordingly whether that would be sufficient or instruct the user equipment to perform a re-selection by redirection or in case the user equipment is in connected mode to command a handover directly.

This invention assures that both transmission directions are taken into account for the handover and or re-selection decision. Additionally the base station can also command network-assisted cell reselection, which is in the following also meant when it is referred to "handover".

According to a preferred embodiment of the invention it is proposed a method for operating a user equipment in a cellular network comprising more than one radio access networks, the user equipment camping on a base station of a first of the more than one radio access networks, hereinafter the serving base station, the first radio access network providing a plurality of frequency ranges, the user equipment maintaining a physical receiver sensitivity value for at least one frequency range, comprising the steps for the user equipment of:
  determining a supported receiver sensitivity level relating to the user equipment's physical receiver sensitivity value for the at least one frequency range populated by the serving base station,
  signaling to the base station the supported receiver sensitivity level,
  reporting to the base station a measured reception level, relating to measured reception of downlink signals from the serving base station,
in case of determination by the base station that the measured reception level is lower than a handover threshold value considering the signaled supported receiver sensitivity level:
  receiving a handover instruction from the base station.

The user equipment is in particular configured to support a plurality of frequency ranges. This is the case due to the fact that in higher technology standards a multitude of frequency ranges is offered. Moreover there exists a worldwide scattering of which cellular network operators are allowed to use which frequency range in which country for 5G service.

The user equipment's receiver is expected to support several of the frequency ranges in a predefined frequency range. This relates to a minimum receiver sensitivity (minRS) which is the predetermined receiver sensitivity that the receiver of a user equipment needs to support at any frequency in order to comply with regulative approvals.

During a running communication session the user equipment carries out measurements of the reception level of signals from the serving base station. The measured reception level (measRXLev) is the measured reception of downlink signals from the serving base station, (in particular at at least one of the frequency ranges supported by the serving base station, whereas the measurements are taken in such a way to be representative for said frequency range e.g. bottom-middle-top) at the user equipment. If the user equipment would move outside of an area where the minimum receiver sensitivity would be sufficient to decode the base stations signals, the measurement reports would reveal this situation to the base station. Hence, the serving base station would according to the known methods instruct the user equipment to carry out a handover, in particular an interRAT handover to a lower standard base station. Especially the radio resource management (RRM) algorithm in the base station will work independent of the error rate, detected for the downlink transmission and just react on the reported signal level. This is especially true for those user equipments doing cDRX, i.e. staying in connected mode as data are about to be transmitted but transmission has not started yet and hence here the radio-resource management can only rely on measurement reports related to general reference signals.

Here comes the embodiment of the invention into play, as the physical receiver sensitivity level of the user equipment for the respective frequency range supported by the serving base station might surpass the minimum receiver sensitivity remarkably. In that case a handover would be way too early and lead to a bad received service quality of the user equipment. E.g. in the case of 4G/5G the data throughput, latency, reliability of the data connection might suffer.

The physical receiver sensitivity (PhyRS) for at least one frequency range is the smallest absolute receiver sensitivity, preferably in dB, at which the receiver of the user equipment is physically able to decode signals from a base station in a special signal form where said special signal form as a reference can be given by reference signals being used for the measurement reference. According to advantageous optimizations of the user equipment's receiver, it is advantageous that at certain frequency ranges the sensitivity is therefore way higher than the minimum receiver sensitivity. This might vary over the supported frequency ranges and is therefore specific for each user equipment. I.e. depending on the target market and operator device manufacturers may target their user equipments to be especially well performing in certain frequency ranges, where certain operators are supported. As this user equipment specific capability is not known to the base station, it cannot be considered for a handover decision in the solutions known in the prior art.

According to this embodiment however it is suggested that the user equipment determines a supported receiver sensitivity level and reports this supported receiver sensitivity level to the serving base station. The supported receiver sensitivity level (SRS): is the level of sensitivity which indicates to the base station the real physical receiver sensitivity level of the user equipment at the frequency range supported by the base station.

In the simplest case the supported receiver sensitivity level represents directly the physical receiver sensitivity value. Preferably a sensitivity class or any other translation for a handy reporting to the base station is selected.

The reporting preferably is carried out during registration resp. camping on the base station. According to another option the signalling of the supported receiver sensitivity level is provided during setup of the connection. Other timings, or on request from the base station are also encompassed by this embodiment of the invention.

According to the regular procedure during a running connection session, the user equipment is reporting to the base station the measured reception level relating to the measured reception of downlink signals—preferably reference downlink signals—from the serving base station. Such measurements are continuously conducted by the user equipment and help the serving base station figure out, if a stable connection can be continued.

With an actual value of the measured reception level and the supported receiver sensitivity level the base station is now in the position to figure out if the user equipment is physically capable to decode the signals received from the user equipment, and hence continue camping or staying connected on the respective base station. This is expected to be evaluated by the base station by comparing the received measured reception level with a handover threshold level (HV). The handover threshold value represents the threshold which the measured reception value is not allowed to pass. The handover threshold value considers the supported receiver sensitivity level which was reported by the user equipment before.

Preferably the handover threshold value additionally considers a hysteresis value, in order to avoid ping-pong situations between two base stations of comparable measures reception level for the user equipment.

Furthermore a safety clearance is considered for the handover threshold value, in order to effect early enough the handover before the connection breaks down, in particular for a user equipment which a certain moving speed. Indications for such a moving speed could moreover be taken into account for determining the handover threshold value.

In other words, when the measured reception level falls below the supported receiver sensitivity level, then the base station is aware of the fact that the continuation of the connection session is endangered. In response the base station is expected to send handover instructions to the user equipment.

Consequently the user equipment expects after reporting of the measured reception level, in particular when it indicates to be below the supported receiver sensitivity level, that the base station is about to send a handover instruction.

The user equipment therefore receives the handover instruction from the serving base station and makes the necessary steps to carry out a handover, in particular an interRAT handover. The handover procedure as such is preferably carried out as known in the technology standards. Advantageously the proposed method does not require material changes at that exercise, and is so far limited to a better finding of a better point in time, when the handover is carried out.

It can be seen that by conducting the handover not before a threshold is reached that directly relates to the user equipment's specific physical receiver sensitivity level, that for a user equipment with optimized receiver sensitivity for the frequency range of the serving base station, the handover instruction will be send substantially later. In other words, the cell area for such user equipments appears much larger, and consequently the coverage of such base stations with a high quality of service appears much better.

It is not generally foreseeable if the uplink or the downlink related threshold will first be achieved for a user equipment moving away from a base station, in particular as it is mainly driven by hardware characteristics of the user equipments transceiver. As both directions are likewise important, with this embodiment it is assured to have undisturbed connectivity, with at the same time sufficient consideration of the user equipments hardware characteristics. This is in particular advantageous as with such a method it is incentivized to improve user equipment hardware way beyond the predefined minimum values which are mandatory for regulatory approval.

According to a preferred embodiment it is suggested that the user equipment further maintains a minimum receiver sensitivity being predetermined by the cellular network, and the step of determining the supported receiver sensitivity level comprises considering a difference between the user equipments physical receiver sensitivity and said minimum receiver sensitivity applicable for the at least one frequency range populated by the serving base station, wherein the handover threshold value relates to the supported receiver sensitivity level plus the minimum receiver sensitivity.

According to this preferred embodiment the user equipment additionally is aware of the minimum receiver sensitivity. This is preferably provided by the serving base station. This is due to the fact that the cellular network predetermined this value, in particular due to the fact that the support of this sensitivity is a precondition for the technical approval of the user equipment.

As any user equipment is supposed to fulfill such minimum receiver sensitivity, that base amount of sensitivity does not need to be reported to the serving base station. It is therefore advantageous when the supported receiver sensitivity level represents the difference between the physical receiver sensitivity level applicable for the at least one frequency range populated by the serving base station and the minimum receiver sensitivity level.

Similar as for the handover the imported physical receiver sensitivity beyond the minimum receiver sensitivity is beneficial also for a user equipment when operating in idle mode, i.e. they can stay longer on said cell but this decision is done autonomously by the user equipment in idle mode or comparable modes not having an active connection and hence no specialized signaling to the base station is needed. The UE would just compare the measured received value to its physical receiver value instead of the known minimum receiver value. However, the base station preferably provides a hysteresis value in addition to be considered in said comparison.

Should the resulting supported receiver sensitivity level lie below a given threshold, it is preferable not to report such supported receiver sensitivity level to the base station in order to save signalling load. The base station would then preferably assume that the physical receiver sensitivity level of the user equipment would complement to the minimum receiver sensitivity level. This embodiment reduces signalling load and moreover simplifies incorporating user equipments that support the inventive method, and others, which do not. According to another preferred embodiment the method further comprises that after the step of signalling the supported receiver sensitivity level the step of sending an attach request to the base station for establishing a connection session.

This embodiment relates to the reporting of the supported receiver sensitivity by the user equipment. With that embodiment it is advantageously achieved a decoupling between signalling of the supported receiver sensitivity and the setting up of a connection session wherein the base station governs handovers of the user equipment. Therefore the user equipment is configured to report the supported receiver sensitivity level for the supported at least one frequency range of the serving base station ahead of setting up a connection.

Preferably this is done at registration time, preferably as part of the user equipments capability provision to the serving base station. As for each base station—which might support different frequency ranges—the supported receiver sensitivity level may vary, it is preferable to supply such report to each base station the user equipment is camping on. That means, that after a reselection the respective supported receiver sensitivity level is transmitted again.

According to another advantageous embodiment it is proposed that the step of determining the supported receiver sensitivity level comprises considering the physical receiver sensitivity, wherein the supported receiver sensitivity level relates to the minimum physical receiver sensitivity level within a given frequency range.

This preferred embodiment acknowledges that even within a frequency range populated by a base station the physical receiver sensitivity level of a user equipment might vary. This is typically due to physical reasons of receiver architecture.

This embodiment copes with this situation in the attempt to determine the supported receiver sensitivity level. As set out before, the supported receiver sensitivity level relates to the physical receiver sensitivity value, be it in total or according to a difference to the minimum receiver sensitivity level. In case of many different physical receiver sensitivity values within the respective frequency range it is according to this embodiment suggested that the minimum physical receiver sensitivity (minPhyRS) value among the respective frequency range is considered and used as a fixed value for the respective base station. This minimum physical receiver sensitivity is in particular the lowest absolute value of receiver sensitivity in dBm for which in all addressable frequency segments of the respective frequency bands certain reference signal can be detected and decoded with a certain reliability as defined for the minimum receiver sensitivity.

This advantageously assures that at the base station the increased handover threshold value is sufficiently high in order to maintain a connection before a handover instruction is transmitted and carried out.

In another preferred embodiment it is suggested that the physical receiver sensitivity value for at least one frequency range is stored in the user equipment.

In this advantageous embodiment the source of the physical receiver sensitivity value is addressed. Preferably such values are provided during a calibration phase in factory resp. before deployment. As such values are expected to be constant over a lifetime of an user equipment, it is advantageous to relief the user equipment from having to determine such values by itself. Even for aging effects the user equipments is preferably configured to maintain by its own the corresponding adaptations. Hence the user equipment preferably holds the physical receiver sensitivity value for a plurality of frequency ranges supported by the user equipment stored in the user equipment. The storing can be made for frequency segments, that is sub-sections of the frequency bands. Preferably composing the values for the frequency segments of the used frequency band leads to the minimum physical receiver sensitivity (minPhyRS).

A similar effect as in the downlink direction can also be observed in the uplink direction. User equipments adopted to a certain frequency range or being more advanced may support higher power than other user equipments in certain frequency bands. In general the effect of different power classes already exists today but is not adaptive to frequency bands supported by a base station. The inventive step is here that a certain power density at the base station shall be achieved, i.e. a minimum signal strength so that the base station can decode the user equipment's signals. The signal received by the base station is a compound of the possible user equipment's transmission power and the pathloss between the user equipment transmitter and base station receiver. When the base station provides the minimum power density which it expects at its receiver, considering that the user equipment knows its own transmission (TX) power capability and the pathloss from the downlink (assuming reciprocity), then the user equipment can decide in idle mode or and other mode whether it needs to perform a reselection or whether its uplink capabilities would still be sufficient to reach the base station.

According to the second aspect of the invention it is suggested a user equipment for operating in a cellular network comprising more than one radio access networks, the user equipment being configured to camp on a base station of a first of the more than one radio access networks, hereinafter the serving base station, and to maintain a normalized transmission power value, indicating the maximum transmission power of the transmitting circuitry of the user equipment, wherein the user equipment is configured to:

receive a predetermined sufficient power level to be achieved at the base station receiver from the base station, derive a pathloss value from signals received from the serving base station, determine a signal power value out of the normalized transmission power value of the user equipment and the pathloss value, when the determined signal power value level is lower than a predetermined sufficient power level at the base station:

perform a cell re-selection to another base station.

According to this aspect of the invention the respective user equipment is equipped with transmitter and receiver circuitry, preferably in the form of a wireless transceiver. This transmitter and receiver circuitry is configured to have the user equipment operate with base stations of at least two radio access networks of a cellular network.

Furthermore the user equipment preferably comprises processing circuitry, permanent and volatile memory. With the processing circuitry the transmitter and receiver circuitry is controlled. Further preferably the suggested operations of the user equipment are controlled by the processing circuitry.

The permanent and/or volatile memory is configured to store values like the preconfigured physical receiver sensitivity value for a couple of frequency ranges. The same applies to the normalized transmission power value.

The second aspect of the invention shares the advantages of the first aspect.

According to the third aspect of the invention it is suggested a method for a base station of a cellular network, configured to serve at least one camping user equipment, said base station supporting at least one frequency band, comprising the steps of:

receiving from at least one of the camping user equipments a signal indicating a supported receiver sensitivity level for the supported frequency band, when operating in connected mode:

receiving from said user equipment a signal indicating a measured reception level, comparing the received measured reception level with the handover threshold value, as a result of said comparison, in case measured reception level is lower than a threshold value considering the received supported receiver sensitivity level:

transmitting a signal to the user equipment indicating a redirection instruction to another frequency.

This aspect of the invention relates to the base station the user equipment is designed to operate with. It is preferably a base station supporting the 5G technical standard. It offers a high quality of service and it is therefore preferable for a user equipment to camp on this base station as long as possible, in particular when operating in connected mode.

According to this aspect it is proposed that at the base station for a camping user equipment a supported receiver sensitivity level is determined for the frequency band supported by the base station. Should the base station support many frequency bands, it is preferably depicted for which frequency band the supported receiver sensitivity level is reported. Further it is encompassed that the base station receives from the user equipment the supported receiver sensitivity level for more than one frequency range.

Such reception of the supported receiver sensitivity level preferably takes place way before a handover decision may be due, preferably at registration time, at the time of connection setup or on request of the user equipment.

Hence during an open connection of the respective user equipment the base station expects to regularly receive measurement reports from the user equipment. Said measurement reports comprising measured reception level of signals transmitted by the base station, and measured at the receiver of the user equipment.

Out of the measured reception level the base station has means to figure out if the user equipment receives sufficiently strong signals from the base station, or is better instructed to carry out a handover to another base station, in particular of another radio access network.

For doing so, the base station compares the received measured reception level with a handover threshold value. Such handover threshold value is considering the user equipments individual received supported receiver sensitivity level for the supported frequency range.

The handover threshold value may additionally take into account a hysteresis value and other safety margins for avoiding ping-pong situations.

When the handover threshold value is not reached by the measured reception level anymore, that means the received signals at the user equipment are too low, then the base station will transmit a signal to the user equipment. With this signal the base station instructs the user equipment to carry out a handover operation to another base station.

This suggested approach is certainly not withstanding other criteria of the base station for deciding for a handover of a respective user equipment. In particular the congestion situation of the base station is preferably taken into account.

Furthermore a requested quality of service of a user equipment, which could also be fulfilled by a base station of a lower technology standard in the proximity is preferably taken into consideration at the base station with respect to which of a couple of camping user equipments in an open connection is preferably instructed to an interRAT handover.

Preferably the base station has stored a minimum receiver sensitivity level which applies to all user equipments. Depending upon the supported receiver sensitivity level determination of the user equipment, the base station will therefore derive the handover threshold value from the supported receiver sensitivity level of the user equipment for the frequency range and the minimum receiver sensitivity level, by way of addition.

Should no supported receiver sensitivity level be provided by the user equipment, the base station has two options:

First, the base station can send a request to the user equipment for reporting such supported receiver sensitivity level.

Alternatively the base station will assume that the handover threshold value corresponds to the stored minimum receiver sensitivity level.

According to another preferred embodiment it is suggest that the base station is further ascertaining a predetermined sufficient power level for camping user equipments, further comprising upon reception of a signal power level value from the at least one camping user equipment the steps of:

transmitting a signal to the user equipment indicating a redirection to another frequency, in case said received signal power level value is lower than the sufficient power level.

This embodiment relates to the uplink direction, where the base station receives from the user equipment a signal power level value. Further the base station ascertains a predetermined sufficient power level. This is a value, preferably provided by the cellular network, resp. radio access network, the base station is belonging to. This value marks the threshold for user equipments sufficient signal strength that the base station can reliably decode. When this threshold is according to the received signal power level value not reached, then the base station is supposed to signal to the user equipment to carry out a handover. Furthermore this sufficient power level is broadcasted by the network. If a user equipment in idle mode determines that due to its UL power capabilities and the evaluated pathloss in DL correspondingly converted to the uplink it will not reach said minimum power level in a communicating attempt it autonomously performs a re-selection. Especially this embodiment is beneficial for non-connected user equipments to evaluate their UL communication capabilities without the need of explicit user equipment signaling.

According to the fourth aspect of the invention it is proposed a base station of a cellular network configured to serve at least one camping user equipment, said base station supporting at least one frequency band, being configured to:
  receive from at least one of the camping user equipments a signal indicating a supported receiver sensitivity level for the supported frequency band,
when operating in connected mode:
  receive from said user equipment a signal indicating a measured reception level,
  compare the received measured reception level with the handover threshold value,
as a result of said comparison, in case measured reception level is lower than a handover threshold value considering the received supported receiver sensitivity level:
  transmit a signal to the user equipment indicating a handover instruction.

According to this aspect it is proposed a base station. Such a base station is part of a radio access network of a cellular network, like an eNodeB for 4G or a gNodeB for 5G. In other embodiments the base station could be configured to support more than one radio access network, whereas comprising at least logical at least one eNodeB per radio access network, which means according to at the respective technology standard.

The base station is communicatively connected to other components of the cellular network. Additionally it comprises transmitting and receiving circuitry for communicating over the air interface with a plurality of user equipments. The transmitting and receiving circuitry is additionally configured to populate at least one frequency range.

Additionally the base station is equipped with processing circuitry, at least for controlling the transmitting and receiving circuitry, as well as the communication circuitry for communicating with other network components.

Further the base station preferably provides permanent and/or volatile memory, at least for storing software and (pre-)configuration data for handling the communication with the user equipments.

This fourth aspect of the invention shares that advantages of the third aspect.

As it is shown this invention advantageously solves the depicted problem and proposes a solution that allows to make use of over the time improving receiver sensitivity, in particular for 5G compliant user equipments. With the inventive solution the coverage area of the respective base stations will be increased from the perspective of the user equipments with improved receiver sensitivity. This will lead to a higher overall acceptance of coming technology standards in total.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows the spatial situation of a user equipment UE camping on a base station (BS) of a cellular network CN. The cellular network is additionally comprising more than one radio access network, in particular 3G, 4G and 5G. The base station BS as such supports one of the radio access networks. Practically a BS-installation might be capable to support more than one radio access networks, logically each of these supports represent one base station BS and for the sake of simplicity in the following it is assumed that each base station BS supports exactly one radio access network.

Figure 1:
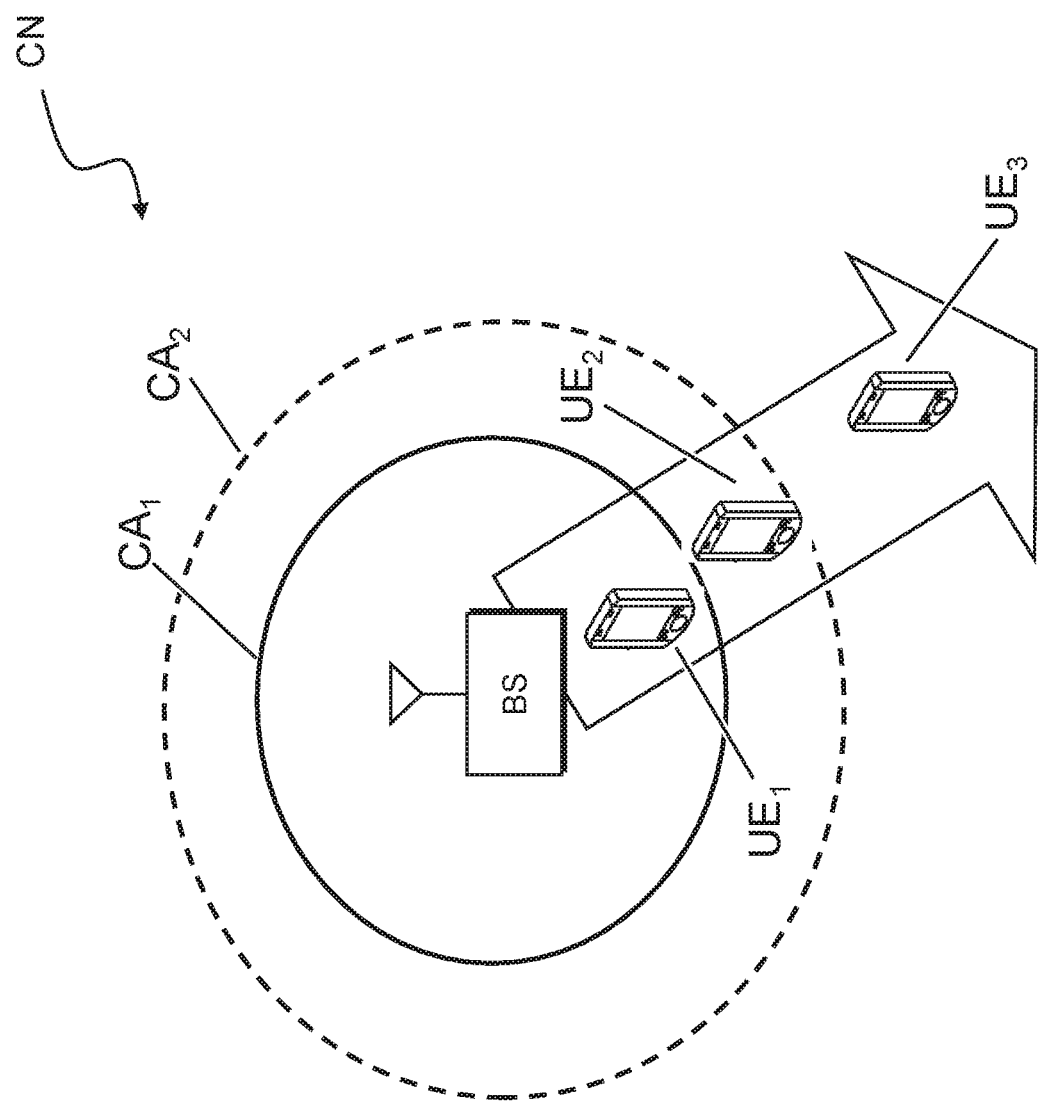
FIG. 1 represents a user equipment of the type to which the present invention is applied as an embodiment operating with a base station of another aspect of the invention.

It is further shown the cell area of the base station BS with two borderlines. The first cell area CA1 represents the size of the cell, when the base station BS assumes the minimum receiver sensitivity of an user equipment UE operating with the base station BS. The base station BS can rely upon that the sensitivity of the UEs receiver in this area is sufficient to receive signals from the base station, and vice versa.

However, a user equipment might have an optimized receiver for the frequency band supported by the base station BS. Then the sensitivity of the UE is much higher, which hence results in a larger cell area.

For a moving user equipment at three times $UE_1$, $UE_2$, $UE_3$ it is shown what the impact of this situation would be. Starting with the position of the user equipment at the first time $UE_1$ it is obvious that the user equipment will be served by the BS, due to the fact that the user equipment is in the core cell area $CA_1$, where each user equipment is supposed to be capable of receiving signals from the base station BS. The base station receives during an open connection measurement reports from the user equipment and as long as the measurement reports indicate that the received signal strength is above the minimum receiver sensitivity, there is no need to evaluate a hand over decision to another base station BS. Preferably such other base station BS supports another radio access network. Preferably such other base station has a larger coverage area, overlapping with the cell area of the current base station. In particular in the context of high speed 5G gNBs this is a likely scenario, as here no full coverage will be achieved.

The minimum receiver sensitivity is preferably stored in the base station BS, as it is a predetermined value, in particular defined by a regulation body. Hence it requires no exchange of this value between user equipment and base station.

When the user equipment is moving away from the base station BS tower then at a second time it is in the position $UE_2$. The user equipment has left the core cell area $CA_1$, but is still in the cell area $CA_2$. However, the cell area $CA_2$ is not known to the base station BS. It represents a receiver sensitivity of the user equipment, which is as such not visible for the base station BS, in other words, different user equipments may have different outer cell areas $CA_2$.

Obviously when the user equipment is at one point outside of the outer cell area $CA_2$, as indicated at the position $UE_3$, then the user equipments receiver is not sufficiently sensitive enough to decode signals from the base station BS. In that case the base station would in a connected mode situation need to carry out a handover to another base station, preferably already at an earlier point in time before the user equipment is beyond the area where no signals from the base station are decodable anymore.

It is apparent that for a base station the position of $CA_2$ would be needed to be available in order to make such a handover decision early enough and sufficiently late. In the 5G scenario it would lead to a very small coverage area with full 5G support, if after leaving the cell area $CA_1$ a handover to a lower (and slower) technology would be carried out.

Figure 2:
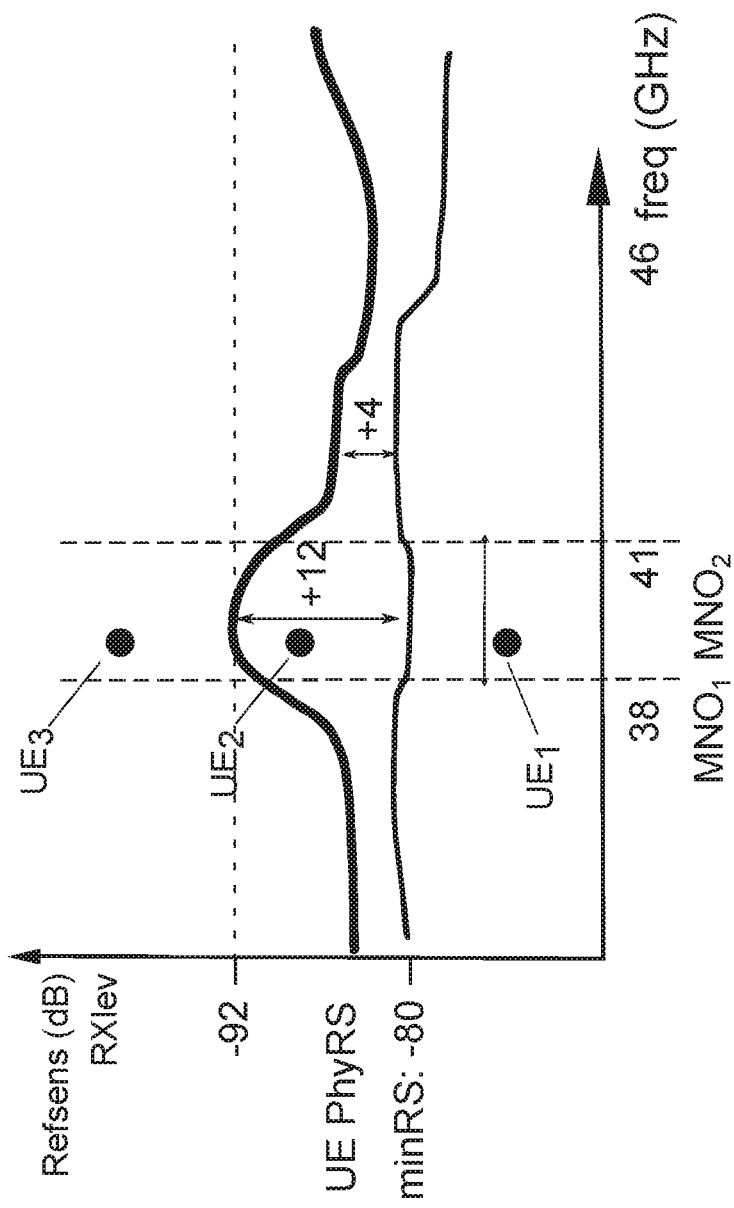
FIG. 2 represents a graph of a combination of sensitivity values for an exemplifying user equipment according to the invention.

The same situation is illustrated in FIG. 2 by a graph indicating sensitivity values in relationship to a supported frequency range. The displayed frequency range values indicate that this exemplifying embodiment of the invention is applied to a 5G scenario. Here it is monitored a base station BS of a certain cellular network of a mobile operator $MNO_2$. The monitored frequency range covers 38 to 41 GHz.

Further a predefined minimum receiver sensitivity (minRS) in dB is drawn in the graph. The sensitivity is in a simple context constant, but for different frequency ranges different dB values might be applicable, which is indicated with a slightly wavy graph, but still around −80 dB it is expected that a user equipment is capable of decoding signals from the BS. For the user equipment $UE_1$ at a first time (corresponding to FIG. 1), this is the case, it is well below this graph, and therefore can be served by the UE.

Secondly in the graph it is additionally drawn the user equipment's specific receiver sensitivity. This is called the physical receiver sensitivity value (PhyRS).

It can be seen that this is in this example by far no constant line. Instead this user equipment is optimized for operating in cellular networks which operate in the frequency range 38-41 GHz. Here the sensitivity is way higher, in the maximum it reaches values of −92 dB and over the full band 38-41 it receives in minimum roughly −90 dBm.

For this user equipment at the position at time $UE_2$ the received signal strength would lie exactly between the minimum receiver sensitivity and the physical receiver sensitivity. During an open connection the BS would instruct the BS for making a interRAT handover into another (slower) network, when it would only rely on the minimum receiver sensitivity minRS.

According to the invention instead the user equipment would report to the BS an indication about the supported receiver sensitivity at the frequency range supported by the BS. In this scenario it would report over the full range a value being approximately 10 dB better corresponding to −90 dBm. This is preferably done when registering resp. camping on the BS, at least early enough to be considered when the connection session is established.

The user equipment has different options for providing this indication. One option is to provide the raw physical receiver sensitivity value. Alternatively the difference between minimum and physical receiver sensitivity is provided. In any case with this reported supported receiver sensitivity level the BS gets the knowledge about the signal strength the user equipment is capable of decoding.

According to the general standardized procedure the user equipment sends during a connection measurement reports indicating the measured reception level, which relates to the measured signal strength (RSRP, RSCP, RSRQ or RXLev), which is e.g. in LTE the average power per resource element that the user equipment is receiving in specific reference signals from the BS or its related quality. With this information the BS knows if the measured reception level is sufficiently high.

Figure 3:
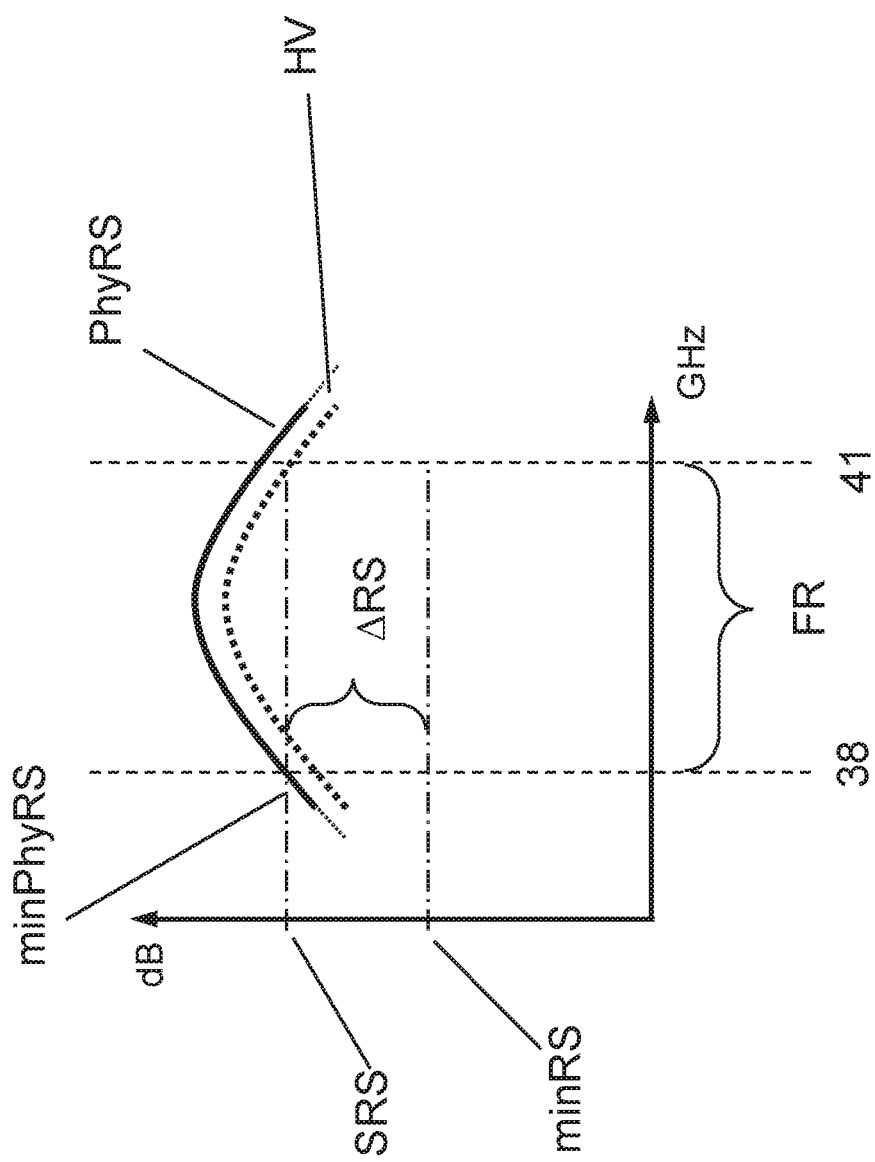
FIG. 3 represents a detail of another graph of a sensitivity values for another exemplifying user equipment according to the invention.

FIG. 3 shows that not necessarily the supported receiver sensitivity level SRS as such is the decisive point, but instead the handover threshold value HV. This is typically somewhat lower than the supported receiver sensitivity level SRS, in particular in order to allow a handover before the connection breaks down. Further a hysteresis effect is achieved.

Additionally it can be seen that in the monitored frequency range FR the user equipment still has varying physical receiver sensitivity PhyRS. This is due to physical restrictions of the receiver. To be on the safe side therefore for the supported receiver sensitivity value, the minimum physical receiver sensitivity minPhyRS within the monitored frequency range should be considered for determining the supported receiver sensitivity level SRS. The minPhyRS is the absolute minimum of the PhyRS across the frequency band resp. frequency range FR of interest.

When these information are available at the base station BS, then in the situation of $UE_2$ (in FIG. 2) no handover instruction would be sent to the user equipment, but prior to reaching in situation $UE_3$ a command would have send, because beyond minPhyRS no decoding could be guaranteed.

With that the user equipment, though moving away from the BS and leaving the core cell area $CA_1$ would still be operated by the BS, and not sent to another BS of another radio access network, before the capabilities of the user equipments receiver are exhausted.

Furthermore such a behavior would additionally incentivize the development of receivers with increased sensitivity and no change on the network side or in the regulation is sufficient to make use of such improvements.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for operating a user equipment in a cellular network comprising more than one radio access networks,
the user equipment camping on a base station of a first of the more than one radio access networks, hereinafter the serving base station, the first radio access network providing a plurality of frequency ranges, and the user equipment further maintaining a physical receiver sensitivity value for at least one frequency range, said method comprises the steps for the user equipment of:
- determining a supported receiver sensitivity level relating to the user equipment's physical receiver sensitivity value for the at least one frequency range populated by the serving base station,
- signaling to the base station the supported receiver sensitivity level,
- reporting to the base station a measured reception level, relating to measured reception of downlink signals from the serving base station,
- in case of determination by the base station that the measured reception level is lower than a handover threshold value considering the signaled supported receiver sensitivity level:
  - receiving a handover instruction from the base station,
- wherein, the user equipment maintaining a normalized transmission power value, indicating the maximum transmission power of the transmitting circuitry of the user equipment, said method further comprises the steps for the user equipment of:
- receiving a predetermined sufficient power level to be achieved at the base station receiver from the base station,
- deriving a pathloss value from signals received from the serving base station,
  - determining a signal power value out of the normalized transmission power value of the user equipment and the pathloss value, wherein, when the determined signal power value level is lower than a predetermined sufficient power level at the base station:
- performing a cell change to another base station,
- wherein the user equipment further maintaining a minimum receiver sensitivity being predetermined by the cellular network, the method further comprises the step of determining the supported receiver sensitivity level comprises considering a difference between the user equipment physical receiver sensitivity and said minimum receiver sensitivity applicable for the at least one frequency range populated by the serving base station,
- wherein the handover threshold value relates to the supported receiver sensitivity level plus the minimum receiver sensitivity.

2. Method according to claim 1, wherein the minimum receiver sensitivity is provided by the serving base station.

3. Method according to claim 1, further comprising after the step of signalling the supported receiver sensitivity level the step of sending an attach request to the base station for establishing a connection session.

4. Method according to claim 1,
- wherein the step of determining the supported receiver sensitivity level comprises considering the physical receiver sensitivity,
- and wherein the supported receiver sensitivity level relates to the minimum physical receiver sensitivity level within a given frequency range.

5. Method according to claim 1, wherein the physical receiver sensitivity value for at least one frequency range is stored in the user equipment.

6. User equipment for operating in a cellular network comprising more than one radio access networks,
- the user equipment being configured to camp on a base station of a first of the more than one radio access networks, hereinafter the serving base station, the first radio access network providing a plurality of frequency ranges, the user equipment maintaining a physical receiver sensitivity value for at least one frequency range, the user equipment is configured to:
  - determine a supported receiver sensitivity level relating to the user equipment's physical receiver sensitivity value for the at least one frequency range populated by the serving base station,
  - signal to the base station the supported receiver sensitivity level,
  - report to the base station a measured reception level, relating to measured reception of downlink signals from the serving base station,
  - in case of determination by the base station that the measured reception level is lower than a handover threshold value considering the signaled supported receiver sensitivity level,
  - receive a handover instruction from the base station,
- wherein, the user equipment further maintaining a normalized transmission power value, indicating the maximum transmission power of the transmitting circuitry of the user equipment, the user equipment is configured to:
- receive a predetermined sufficient power level to be achieved at the base station receiver from the base station,
- derive a pathloss value from signals received from the serving base station,
- determine a signal power value out of the normalized transmission power value of the user equipment and the pathloss value,
- when the determined signal power value level is lower than a predetermined sufficient power level at the base station,
- perform a cell change to another base station, wherein, the user equipment further maintaining a minimum receiver sensitivity being predetermined by the cellular network, the determination of the supported receiver sensitivity level comprises considering a difference between the user equipment physical receiver sensitivity and said minimum receiver sensitivity applicable for the at least one frequency range populated by the serving base station,
- wherein the handover threshold value relates to the supported receiver sensitivity level plus the minimum receiver sensitivity.

7. Method for a base station of a cellular network, configured to serve at least one camping user equipment, said base station supporting at least one frequency band, comprising the steps of:
- receiving from at least one of the camping user equipments a signal indicating a supported receiver sensitivity level for the supported frequency band,
- when operating in connected mode:
  - receiving from said user equipment a signal indicating a measured reception level,
  - comparing the received measured reception level with the handover threshold value,
  - as a result of said comparison, in case measured reception level is lower than a handover threshold value considering the received supported receiver sensitivity level, transmitting a signal to the user equipment indicating a handover instruction, wherein
  - the base station is further ascertaining a minimum receiver sensitivity level, and said handover threshold value relates to the received supported receiver sensitivity level plus the minimum receiver sensitivity.

8. Method according to claim 7, wherein the base station is further ascertaining a predetermined sufficient power level for camping user equipment, further comprising upon reception of a signal power level value from the at least one camping user equipment performs the step of:

transmitting a signal to the user equipment indicating a redirection to another frequency, in case said received signal power level value is lower than the sufficient power level.

9. Base station of a cellular network configured to serve at least one camping user equipment, said base station supporting at least one frequency band, being configured to:

receive from at least one of the camping user equipment a signal indicating a supported receiver sensitivity level for the supported frequency band, when operating in connected mode:

receive from said user equipment a signal indicating a measured reception level, compare the received measured reception level with the handover threshold value, as a result of said comparison, in case measured reception level is lower than a handover threshold value considering the received supported receiver sensitivity level, transmit a signal to the user equipment indicating a handover instruction, said base station being further configured to ascertaining a minimum receiver sensitivity level, wherein said handover threshold value relates to the received supported receiver sensitivity level plus the minimum receiver sensitivity.

10. Base station according to claim 9, further configured to ascertaining a predetermined sufficient power level for camping user equipments, further configured, upon reception of a signal power level value from the at least one camping user equipment, to:

transmit a signal to the user equipment indicating a handover instruction, in case said received signal power level value is lower than the sufficient power level.

* * * * *